(12) United States Patent
Fabre et al.

(10) Patent No.: US 8,031,070 B2
(45) Date of Patent: Oct. 4, 2011

(54) AUTOMATED SYSTEM FOR PRODUCING LOCATION-BASED INVENTORIES

(75) Inventors: Bruno Fabre, Cavaillon (FR); Nathalie Chateau, Cavaillon (FR); Adrien Vallet, Salon de Provence (FR); Guy Venture, Senas (FR)

(73) Assignees: NBG ID, Cavaillon (FR); Neopost Technologies, Bagneux (FR)

( * ) Notice: Subject to any disclaimer, the term of this patent is extended or adjusted under 35 U.S.C. 154(b) by 598 days.

(21) Appl. No.: 11/847,744

(22) Filed: Aug. 30, 2007

(65) Prior Publication Data

US 2008/0055088 A1 Mar. 6, 2008

(30) Foreign Application Priority Data

Aug. 31, 2006 (FR) ...................................... 06 53522

(51) Int. Cl.
*G08B 13/14* (2006.01)
(52) U.S. Cl. ............... 340/572.1; 340/10.1; 340/539.13; 340/988
(58) Field of Classification Search ................ 340/572.1
See application file for complete search history.

(56) References Cited

U.S. PATENT DOCUMENTS

| | | | | |
|---|---|---|---|---|
| 4,542,489 A | * | 9/1985 | Naruse | 367/93 |
| 5,300,922 A | * | 4/1994 | Stoffer | 340/572.1 |
| 6,774,811 B2 | * | 8/2004 | Kaufman et al. | 340/825.49 |
| 7,044,373 B1 | * | 5/2006 | Garber et al. | 235/385 |
| 7,394,382 B2 | * | 7/2008 | Nitzan et al. | 340/572.8 |
| 7,548,166 B2 | * | 6/2009 | Roeder et al. | 340/572.7 |
| 2002/0070862 A1 | * | 6/2002 | Francis et al. | 340/572.1 |
| 2004/0144842 A1 | * | 7/2004 | Brignone et al. | 235/385 |
| 2005/0151650 A1 | * | 7/2005 | Wright et al. | 340/572.4 |
| 2005/0200457 A1 | | 9/2005 | Bridgelall et al. | |
| 2006/0082440 A1 | | 4/2006 | Glaser et al. | |
| 2007/0013519 A1 | * | 1/2007 | Chung et al. | 340/572.1 |
| 2007/0085682 A1 | * | 4/2007 | Murofushi et al. | 340/572.1 |
| 2007/0176782 A1 | * | 8/2007 | Mohalik | 340/572.1 |
| 2007/0200724 A1 | * | 8/2007 | Lazo et al. | 340/693.1 |
| 2007/0252702 A1 | * | 11/2007 | Wulff et al. | 340/572.8 |
| 2007/0282482 A1 | * | 12/2007 | Beucher et al. | 700/225 |
| 2008/0074264 A1 | * | 3/2008 | Sharpe et al. | 340/572.1 |
| 2008/0266092 A1 | * | 10/2008 | Campero et al. | 340/572.1 |

FOREIGN PATENT DOCUMENTS

| | | |
|---|---|---|
| EP | 1 666 382 A1 | 6/2006 |
| WO | WO 01/52179 A2 | 7/2001 |
| WO | WO 2006/070460 A1 | 7/2006 |

* cited by examiner

*Primary Examiner* — Benjamin C Lee
*Assistant Examiner* — Curtis King
(74) *Attorney, Agent, or Firm* — Sughrue Mion, PLLC

(57) ABSTRACT

A system for producing a location-based inventory of objects each furnished with an RFID transponder (24) designed to interact with an RFID reader/interrogator (30) and placed at different locations of a warehousing structure (10) including a plurality of rows (16A-16C) supported by vertical uprights (18A-18D). Each of the uprights of this warehousing structure is furnished at each of the rows with an RFID location transponder (26) and a processor (30; 32) to produce a location-based inventory of the objects present on the warehousing structure according to the information received from the transponders.

11 Claims, 4 Drawing Sheets

AUTOMATED SYSTEM FOR PRODUCING LOCATION-BASED INVENTORIES

FIELD OF THE INVENTION

The present invention relates to the field of logistics and of storage of various objects and it relates more particularly to the inventory of objects warehoused in general stores, warehouses, workshops, libraries or any other places of storage.

PRIOR ART

The collection and handling of objects, for example in general stores for the purpose of dispatching them, particularly when it involves carrying out the latter operations quickly and without errors, requires a complete and location-based inventory of these objects. The production of such an inventory is a long and tiresome task and, in order to prevent any source of errors, it requires a particular attention on the part of the handlers who usually carry out this operation. The inventory of a goods warehouse may thus take several days.

With application US2004/0111335, an inventory system is known that is based on the use of RFID indicators placed on the articles to be inventoried and designed to interact with an RFID reader moving amongst these indicators and interrogating each of them in turn. The movement of the reader is supposed to be carried out continuously in the three dimensions of the space via a set of cables and pulleys.

This system however seems little suited to the location of objects placed in a warehouse on shelves or racks of a pallet rack.

OBJECT AND DEFINITION OF THE INVENTION

The object of the present invention is to alleviate this disadvantage by proposing an automated system that is both simple and economical for reliably and quickly producing an inventory making it possible to locate objects.

This object is achieved by a system for producing location-based inventories of objects each furnished with an RFID transponder designed to interact with an RFID reader/interrogator and placed at different locations of a warehousing structure consisting of a plurality of rows supported by vertical uprights, characterized in that each of the uprights of this warehousing structure is furnished at each of the rows with an RFID location transponder and in that it comprises processing means for producing a location-based inventory of the objects present on the said warehousing structure according to the information received from the transponders.

Therefore, the use of RFID location transponders on the uprights of the warehousing structure makes it possible to precisely determine the locations of each of the objects to be inventoried.

Advantageously, each of the beginning uprights and end uprights of a row is also furnished with a lock-on marker designed to interact with a lock-on device associated with the said RFID reader/interrogator. Therefore, the lock-on device makes it possible to ensure an optimum read.

Preferably, the system comprises a presence detector to indicate or not the presence of an object in each of the locations of the said warehousing structure.

In a preferred embodiment, the said RFID reader/interrogator, the said presence detector and the said lock-on device are mounted on a forklift truck designed to pass in front of each of the rows of the said warehousing structure.

Advantageously, the said lock-on device comprises an optical transceiver assembly and the said presence detector comprises an ultrasound sensor.

According to the envisaged embodiment, the said processing means may consist of a remote management data processing assembly to which the information received from the transponders that is necessary for producing the location-based inventory is retransmitted by the said RFID reader/interrogator from wireless transceiver means.

The present invention also relates to a method for producing a location-based inventory of objects each furnished with an RFID transponder designed to interact with an REID reader/interrogator and placed at different locations in a warehousing structure consisting of a plurality of rows supported by vertical uprights each comprising at each of the rows an RFID location transponder, the said method consisting in moving the said RFID reader/interrogator in front of each of the rows of the said warehousing structure in turn and, during this movement, in interrogating and reading the data received from the RFID transponders of the said objects and the data received from each of the RFID location transponders, and from this reading in determining the location of each of the said objects in the said warehousing structure.

Advantageously, the said data acquisition is disabled for the time necessary for the RFID reader/interrogator to pass from one row to another.

In order to determine the location of each object, a first filtration is carried out on the data received from the transponders by deleting the spurious reads and by retaining only the majority reads. A second filtration is also carried out consisting in generating a weighted average of the reads relative to a determined transponder in order to make it possible to place the barycentres of each of these transponders in sequential order.

Preferably, a verification of the consistency of the inventory is also carried out by comparing the number of objects inventoried in a determined zone of the said warehousing structure with the number of locations available in the said determined zone.

Preferably, during the said movement, the presence or absence of an object in each of the locations of the said warehousing structure is determined.

BRIEF DESCRIPTION OF THE DRAWINGS

The features and advantages of the present invention will better emerge from the following description, that is given as an indication and is non-limiting, with respect to the appended drawings in which.

DETAILED DESCRIPTION OF A PREFERRED EMBODIMENT

Figure 1:
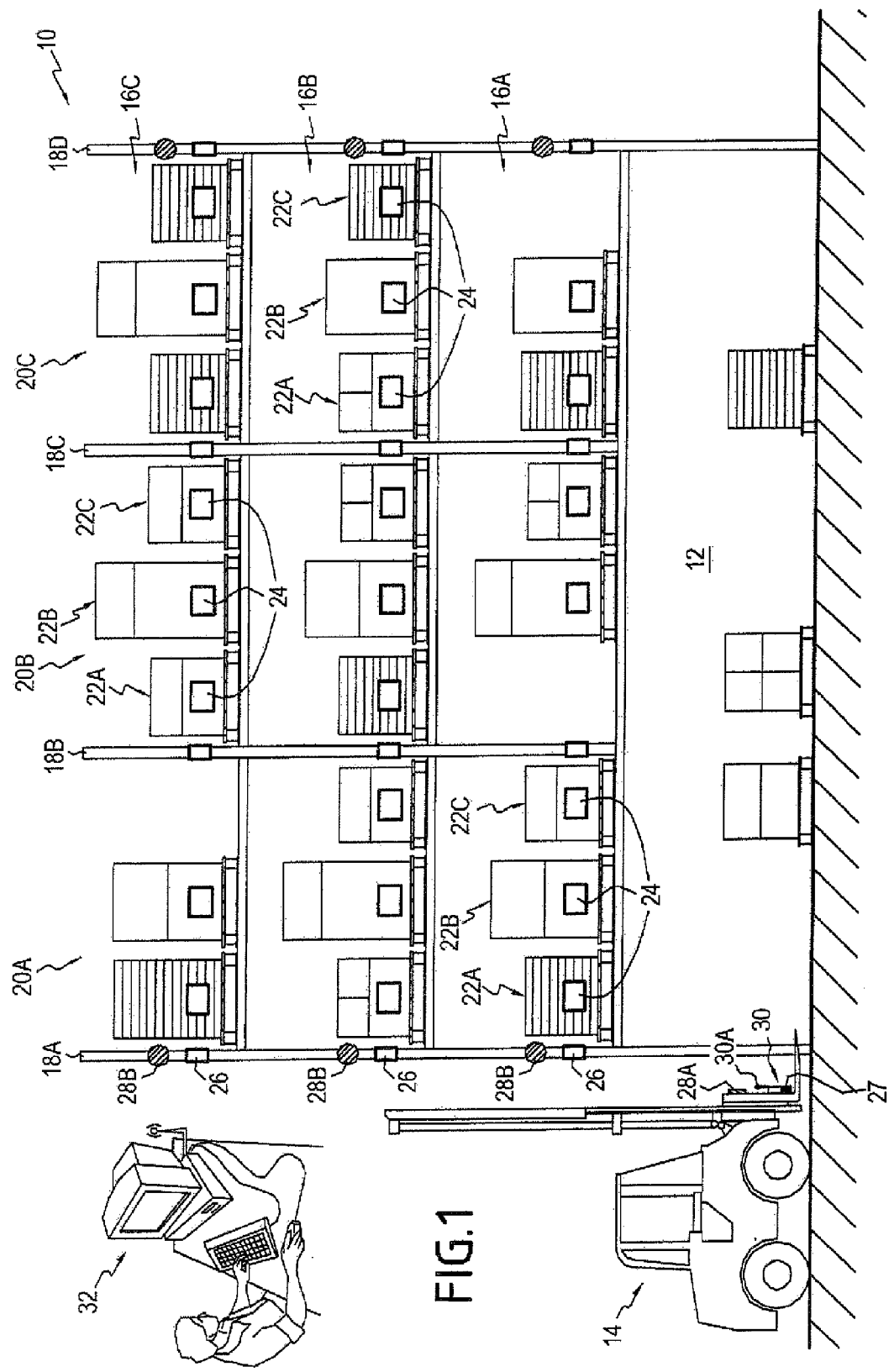
FIG. 1 is a schematic view of a system for producing location-based inventories according to the invention used on a pallet rack in a goods storage workshop.

FIG. 1 shows very schematically a goods warehouse comprising a warehousing structure or pallet rack 10 surmounting a picking zone 12 in which the orders are prepared. The goods are placed in their allocated pallet rack location by means of a forklift truck 14 which a forklift truck driver can then move in front of all the locations of the pallet rack. It will be noted that in certain industrial fields (a media library for example), the truck can with advantage be replaced by a fully robotized standalone system requiring no human intervention.

The pallet rack consists of several rows (for example 16A, 16B, 16C) attached at determined heights on vertical uprights, for example 18A, 18B, 18C, 18D. At each row, each bay 20A, 20B, 20C formed between two successive vertical uprights comprises a determined number of locations, for example 22A, 22B, 22C. The distances between two successive rows and between two vertical uprights may or may not be identical.

Each pallet comprises a radiofrequency transceiver (RFID Tag 24) positioned either on the support itself or on the goods. Preferably, the latter serves as an identification both of the pallet and of its content (to allow for example the management of the stock and of the replacements and for keeping the cost accounts of the warehouse). This miniaturized RFID transponder that conventionally comprises memory means may for example be incorporated into a label affixed to the plastic covering surrounding the pallet, preferably always substantially in the same determined location, in height and width, relative to the standardized dimensions of the pallet.

According to the invention, each vertical upright of the warehousing structure is furnished at each row with a radiofrequency transceiver (RFID Tag 26) designed for locating the pallets. In the example illustrated, an RFID location transponder is provided in all three pallet locations. Naturally, any other configuration, with or without identical numbers per row, can be envisaged. However, for a given row, all these transponders are placed at one and the same predetermined height.

To make it possible to detect any empty locations, provision is made for the system according to the invention to comprise an ultrasound sensor 27 or any other equivalent presence detection means to detect the presence or absence of a pallet at each of the locations of the pallet rack. Preferably, this presence detector is placed on the forklift truck 14 but a placement at each location of the pallet rack can also be envisaged.

Finally, a lock-on device 28A, preferably with optical transmission/reception, which has a lock-on marker 28B on each of the two end vertical uprights of each row, is provided on the forklift truck (or a robotized device performing the function thereof), to allow a precise positioning of the interrogation means 30 carried by the forklift truck or the robotized device.

Specifically, the radiofrequency read/interrogation means with which this truck is provided are designed to interact with the transponders of each pallet 24 and the location transponders 26, in order to allow a complete, rapid and reliable geographic-location-based inventory of the warehousing structure. Therefore, by detecting both the location and pallet transponders, it is possible to identify without possible error the precise location (positioning) of each pallet on the pallet rack.

This RFID reader/interrogator conventionally comprises transceiver means formed of one or more antennas specially adapted for RFID transmissions, for example of the parabolic type, with rectangular waveguide or with planar array. This radiofrequency antenna is coupled, as is known, to a self-energized electronic module comprising a radiofrequency source and electronic components (power supply, modulator, detectors converter, processing unit) necessary for remotely supplying the transponders and for storing identification information exchanged between the electronic module and the transponders. Depending on the available memory capacity, the information received to produce the inventory of the warehoused objects may be processed in real time totally or partly in the processing unit of the RFID reader/interrogator or off-line outside the latter.

In this second case and according to an envisaged configuration, the radiofrequency antenna may also serve as a relay for a master transceiver assembly, as described for example in U.S. Pat. No. 5,936,527, directly connected to a remote data processing assembly 32 capable of producing this inventory and of managing the warehouse via an internal database. But preferably the RFID reader/interrogator incorporates short-range wireless transceiver means 30A, of the Bluetooth or WiFi type for example, in order to retransmit the information received from the transponders (and from the status data of the presence detector) for the purpose of producing the inventory to this data processing assembly then comprising a compatible wireless transceiver means to receive this information.

Figure 2:
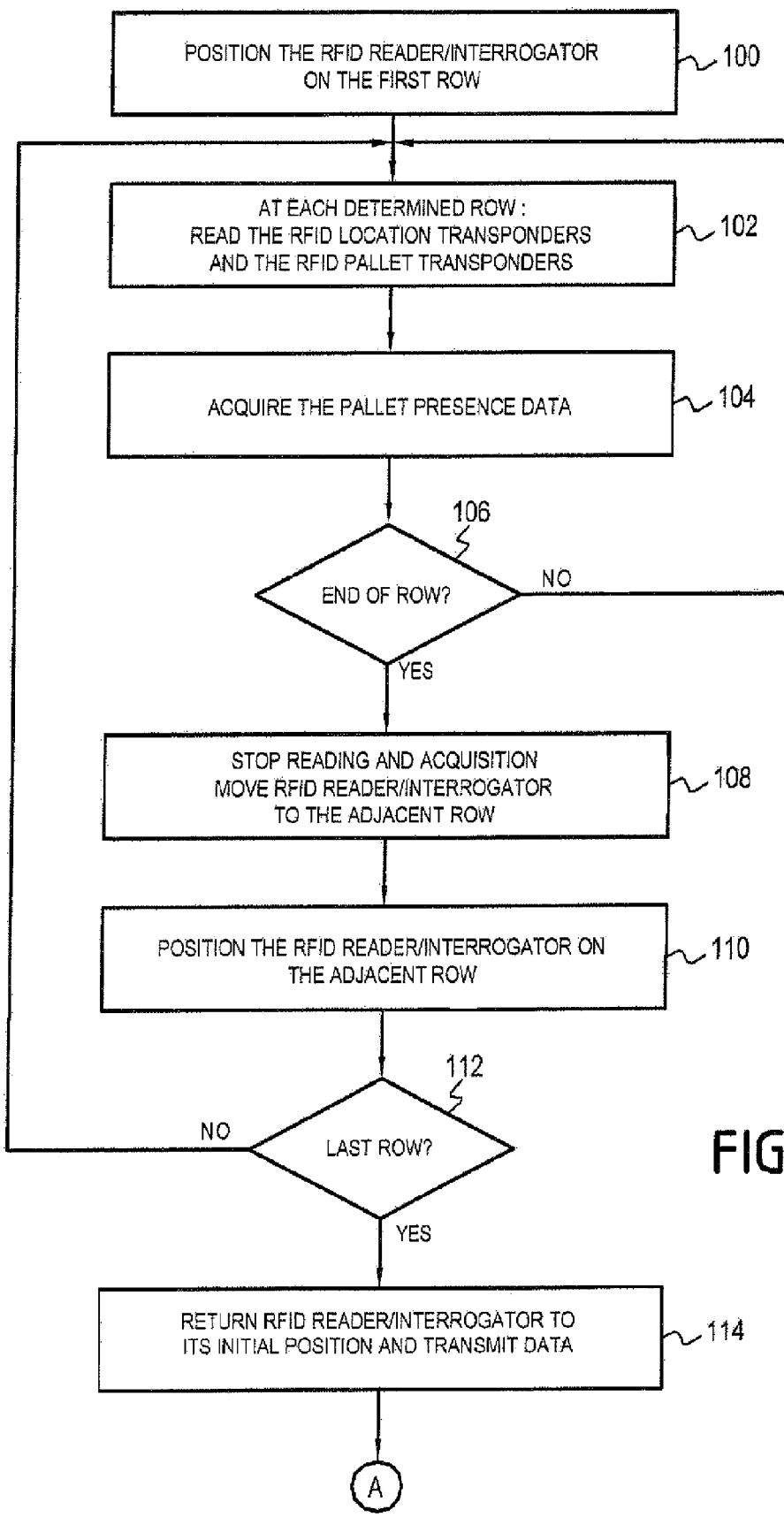
FIGS. 2 and 3 illustrate the various steps of the inventory data acquisition and processing method.
Figure 3:
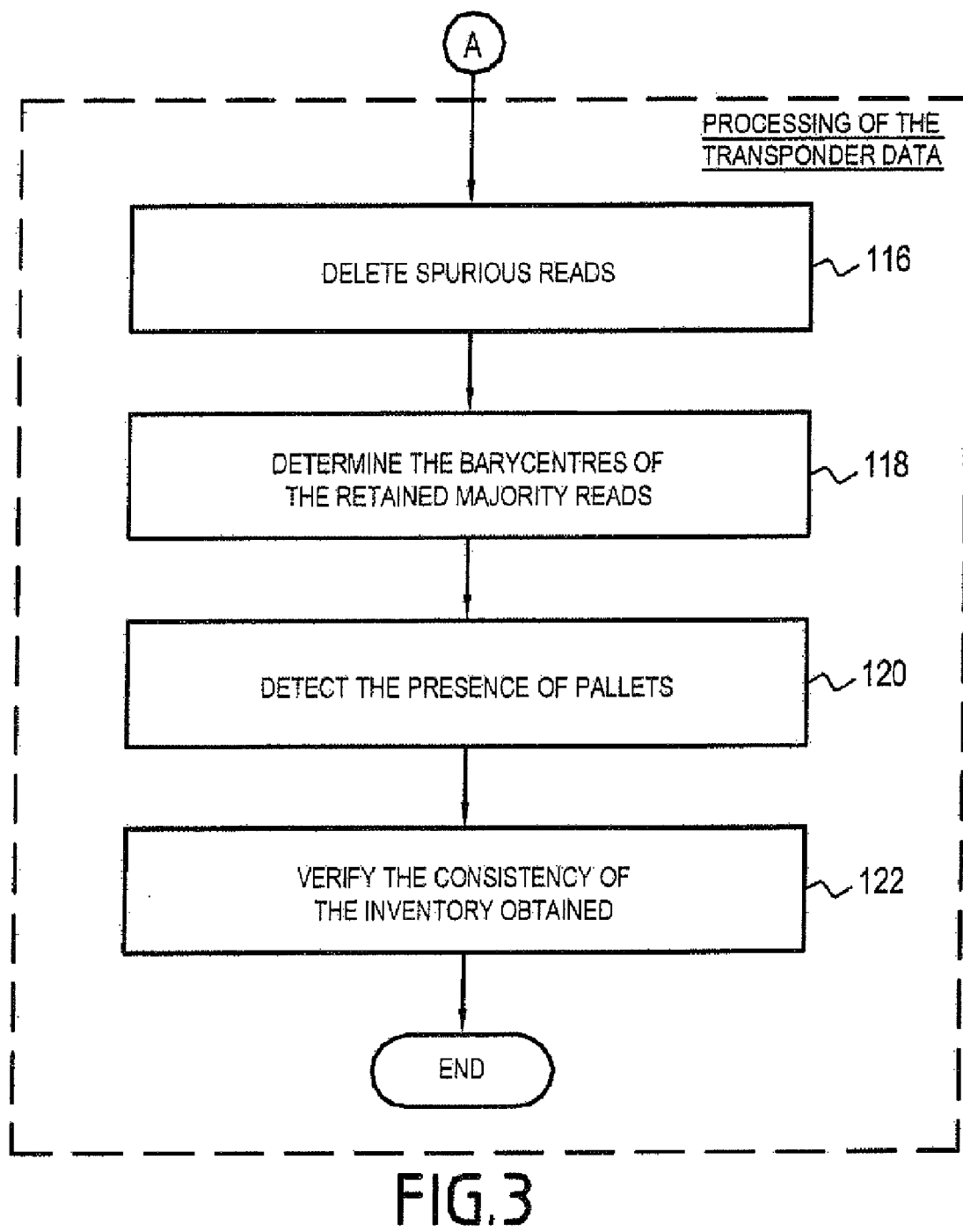

The method used in the system according to the invention is now described with reference to FIGS. 2 to 4.

The first step 100 of the inventory consists in placing the forklift truck in front of a first upright at one end of the first row 16A in order to allow the lock-on device to position the RFID reader/interrogator at a predetermined height ensuring an optimum read of the transponders, that is to say at a height corresponding to that of the location transponders on which the transponders of the pallets are preferably aligned.

Once this lock-on has been carried out, the truck may then, in a subsequent step 102, pass in front of the warehousing structure all along the first row, in order, as is known, to acquire the data read from the transponders. During this movement, the status data delivered by the presence detector are also acquired (step 104). At the other end of the row, once the lock-on marker associated with the last upright has been detected (test of step 106), acquisitions of new data are disabled (zone with no read Z0 in FIG. 4), long enough to allow the truck to turn round and the RFID reader/interrogator to move to the second row (step 108) in order to allow the lock-on device, in a step 110, to position the RFID reader/interrogator at a new predetermined height ensuring an optimum read of the transponders of the second row.

Then, as previously, the data of the transponders and the status data of the second row are acquired before the truck turns round again at the end of this new row. The process is repeated in this way for all the rows of the warehousing facility up to the last upright 18D of the last row 16C (step 112) after which the acquisition of the data necessary for the inventory is terminated and the truck may return to its initial position (step 114).

In order to provide the geographic-location-based inventory of the warehousing structure, these data accumulated in the memory means of the reader/interrogator are then either processed totally or partly in real time directly by the processing means of the RFID reader/interrogator or transmitted to the remote management data processing assembly 32 which carries out off-line processing. It will be noted however that, depending on the storage capacity of the RFID reader/interrogator, the data may also be transmitted gradually as these data are read.

Figure 4:
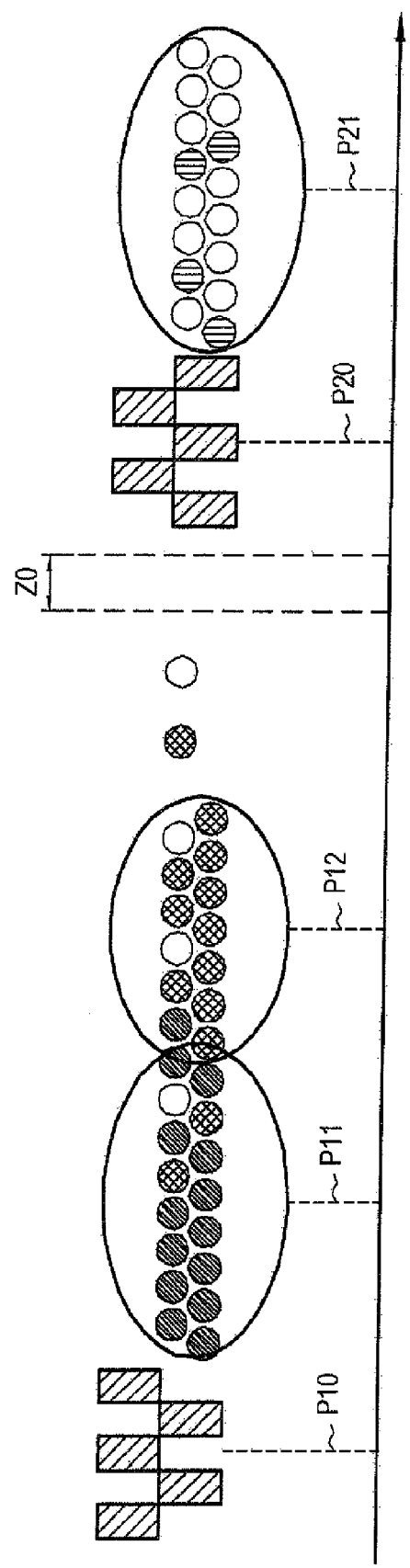
FIG. 4 shows an example of the positioning of the objects from the collected inventory data.

The processing of the data culminating in the geographic-location-based inventory is described more precisely with reference to FIG. 4 which shows as an illustration the processing with reference to FIG. 1 of the last bay 20C of the first row 16A and that of the first location 22C situated on the row 16B immediately above.

It consists first of all in a step 116 of carrying out a first filtration on the data received from the transponders by deleting the spurious reads and keeping only the majority reads. Specifically, the location and pallet transponders are read several times during the movement of the truck (see for example in FIG. 4 the five reads of the first location transponder or the 13 reads of the first pallet transponder) and one and the same transponder can be read during the pass in front of two superposed rows or in front of two adjacent bays (see for example in FIG. 4 the double read of the transponder of the second pallet of the last bay during the pass in front of the first pallet of this same bay and the read of a pallet transponder of the second row during the pass in front of the first pallet of the first row).

Once this first filtration has been carried out, all that remains is pertinent reads of transponders and a second filtration can then be carried out in a step 118 consisting in the generation of a weighted average of the reads relative to a determined transponder in order to make it possible to place the barycentres of each of the location or pallet transponders in sequential order. Therefore, each transponder is positioned in time and relative to the others, particularly relative to the location transponders (see in FIG. 4, the various positionings thus obtained from P10 to P21).

In a subsequent step 120, the data originating from the presence detector are analyzed in order to determine whether a zone with no transponder read (or with insignificant reads as illustrated in FIG. 4 at the third location of the last bay of the first row) corresponds to an empty location, that is to say left with no pallet, or to the presence of a pallet whose transponder is defective and therefore inactive. Specifically, if the detector detects the presence of an obstacle, it is that a pallet with no transponder is stored in the corresponding location, otherwise it is that this location is empty (see in FIG. 4, the last location of the last bay of the first row).

Finally, the consistency of the results obtained is verified in a final step 122 by ensuring that each bay does not contain more pallets than there are locations, that is to say that the number of inventoried objects in a determined zone of the warehousing structure, in this instance a bay, matches the number of locations available in this zone, in this instance three in the example of the pallet rack of FIG. 1 (but this number is in no way limiting).

With this inventory method, the interventions of the various handlers are reduced as much as possible which limits the risks of error (that are particularly harmful in the case of high-value goods or goods whose sale is regulated) or of omission due to the tiresome character of this task and significantly increases the reading rates.

Therefore, for example, an inventory in a warehouse of an express parcel carrier may be produced in two hours with two forklift truck drivers instead of three days with several handlers each furnished with a barcode reader.

It will be noted that, although the above description has been made essentially with respect to goods, it may naturally be applied to any other type of objects each fitted with a transponder and being able to be stored in any warehousing place such as a workshop, a library, a museum, a pharmacy and whose inventory is taken by means of a movable interrogation device of the truck or other type, whether this device can be moved from the ground as described or suspended from the ceiling of this warehousing place.

The invention claimed is:

1. System for producing location-based inventories of objects each furnished with an RFID transponder (24) designed to interact with an RFID reader/interrogator (30) and placed at different locations of a warehousing structure (10) including a plurality of rows (16A-16C) supported by vertical uprights (18A-18D), wherein each of the vertical uprights is furnished at each of the rows with an RFID location transponder (26) and wherein each of the beginning uprights (18A) and end uprights (18D) of a row is also furnished with a lock on marker (28B) designed to device (28A) associated with the RFID read/interrogator, wherein the system comprises:

processing means (30; 32) for producing a location-based inventory of the objects present on the said warehousing structure according to information received from the RFID transponders and the RFID location transponders and for providing a location of the RFID reader/interrogator relative to the warehousing structure, reading of said received information being disabled by said processor means for the time necessary for the RFID reader/interrogator to pass from one row to another, the RFID reader/interrogator conducting multiple reads on each of the RFID transponders and the RFID location transponders; and a first filtration means for filtering data received and read from the RFID transponders and the RFID locator transponders by deleting spurious reads and by retaining only majority reads.

2. System according to claim 1, wherein the said lock-on device comprises an optical transceiver assembly.

3. System according to claim 1, further comprising a presence detector (27) to indicate or not the presence of an object in each of the said locations of the warehousing structure.

4. System according to claim 3, wherein the said presence detector comprises an ultrasound sensor.

5. System according to claim 3, wherein the said RFID reader/interrogator (30), the said presence detector (27) and the said lock-on device (28A) are mounted on a forklift truck (14) designed to pass in front of each of the rows of the said warehousing structure.

6. System according to claim 1, wherein the said processing means include a remote management data processing assembly (32) to which the information received from the RFID transponders and RFID location transponders that is necessary for producing the location-based inventory is retransmitted by the said RFID reader/interrogator from wireless transceiver means (30A).

7. Method for producing a location-based inventory of objects each furnished with an RFID transponder designed to interact with an RFID reader/interrogator and placed at different locations in a warehousing structure including a plurality of rows supported by vertical uprights including respective beginning and end uprights each comprising at each of the rows an RFID location transponder, the said method comprising the steps of:

providing each of the beginning uprights and end uprights of a row with a lock-on marker configured to interact with a lock-on device associated with the RFID reader/interrogator;

moving said RFID reader/interrogator in front of each of the rows of the said warehousing structure in turn;

during this movement, interrogating and reading data received from the RFID transponders of the said objects and data received from each of the RFID location transponders a multitude of times, from this reading determining the location of each of the said objects in the said warehousing structure and the location of the RFID reader/interrogator with respect to the warehouse structure, reading of said data received from said RFID transponders and said RFID location transponders being disabled by processing means for the time necessary for the RFID reader/interrogator to pass from one row to another, and to determine the location of each object, carrying out a first filtration on the data received and read from the RFID transponders and the RFID location transponders by deleting spurious reads and by retaining only majority reads.

8. Method according to claim 7, further comprising the step of carrying out a second filtration including generating a weighted average of the majority reads relative to a determined RFID transponder or RFID location transponder in order to make it possible to place the barycentres of each of the RFID transponders or RFID location transponders in sequential order.

9. Method according to claim 7, further comprising carrying out a verification of the consistency of the inventory by comparing the number of objects inventoried in a determined zone of the said warehousing structure with the number of locations available in the said determined zone.

10. Method according to claim 7, wherein during the said movement, the presence or absence of an object in each of the locations of the said warehousing structure is also determined.

11. System according to claim 1, further comprising a second filtration means for generating a weighted average of the majority reads relative to a determined RFID transponder or RFID location transponder in order to make it possible to place the barycentres of each of the RFID transponders or RFID location transponders in sequential order.

* * * * *